(12) United States Patent
Otero Martinez et al.

(10) Patent No.: US 9,260,628 B2
(45) Date of Patent: Feb. 16, 2016

(54) POLYUREA ELASTOMERS HAVING INCREASED CHEMICALS RESISTANCE

(71) Applicant: BASF SE, Ludwigshafen (DE)

(72) Inventors: Iran Otero Martinez, Lemfoerde (DE); Dejan Petrovic, Ludwigshafen (DE); Zeljko Tomovic, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 37 days.

(21) Appl. No.: 13/957,628

(22) Filed: Aug. 2, 2013

(65) Prior Publication Data

US 2014/0037855 A1 Feb. 6, 2014

Related U.S. Application Data

(60) Provisional application No. 61/679,816, filed on Aug. 6, 2012.

(51) Int. Cl.
| | |
|---|---|
| *C09D 175/02* | (2006.01) |
| *C08G 18/63* | (2006.01) |
| *C08G 18/81* | (2006.01) |
| *C08G 18/10* | (2006.01) |

(52) U.S. Cl.
CPC .............. *C09D 175/02* (2013.01); *C08G 18/10* (2013.01); *C08G 18/632* (2013.01); *C08G 18/636* (2013.01); *C08G 18/8108* (2013.01)

(58) Field of Classification Search
CPC ..................................................... C09D 175/02
See application file for complete search history.

(56) References Cited

U.S. PATENT DOCUMENTS

| | | |
|---|---|---|
| 4,286,074 A | 8/1981 | Davis et al. |
| 2008/0097068 A1 | 4/2008 | Thiede et al. |
| 2011/0098417 A1 | 4/2011 | Worley et al. |

FOREIGN PATENT DOCUMENTS

| | | |
|---|---|---|
| EP | 0 084 841 A2 | 8/1983 |
| EP | 0 528 432 A2 | 2/1993 |
| EP | 1 112 838 A1 | 7/2001 |
| WO | WO 2009/138379 A2 | 11/2009 |
| WO | WO 2010/039986 A1 | 4/2010 |

*Primary Examiner* — Nathan T Leong
(74) *Attorney, Agent, or Firm* — Oblon, McClelland, Maier & Neustadt, L.L.P.

(57) ABSTRACT

The present invention relates to a process for preparing polyurea elastomers, in which (a) polyisocyanates are mixed with (b) polyamines, (c) optionally amine chain extenders comprising primary or secondary amine groups, (d) optionally polyols and (e) optionally auxiliaries and additives to form a reaction mixture and cured, where at least one of the components (a) to (d) comprises dispersed filler particles.

18 Claims, No Drawings

POLYUREA ELASTOMERS HAVING INCREASED CHEMICALS RESISTANCE

CROSS REFERENCE TO RELATED APPLICATION

This application claims the benefit of U.S. Provisional Application No. 61/679,816 filed on Aug. 6, 2012.

The present invention relates to a process for preparing polyurea elastomers, in which (a) polyisocyanates are mixed with (b) polyamines, (c) optionally amine chain extenders comprising primary or secondary amine groups, (d) optionally polyols and (e) optionally auxiliaries and additives to form a reaction mixture and cured, where at least one of the components (a) to (d) comprises dispersed filler particles.

Polyurea elastomers display, in particular, a high resistance to environmental influences, a high chemicals resistance and rapid curing in often only a few seconds. Polyurea elastomers are therefore frequently used as coating agents to protect surfaces in regions subject to severe stress. Their elastomeric properties protect the substrate against mechanical stress, while their high chemicals resistance protects the underlying material against chemical attack. Typical fields of use of polyurea elastomers, in particular polyurea spraying elastomers, are therefore coatings, in particular for concrete repair and protection against water (roof coatings, parking deck coatings, bridge repairs, tunnel repairs), "secondary containment" (coatings for collection basins for tanks for chemicals, wastewater or oil or dangerous goods loading zones), corrosion protection (loading areas of freight ships, goods vehicles, pick-ups and railroad cars) or "primary containment" (wastewater shafts, water treatment plants). However, the chemicals resistance can be improved further, especially in a highly acidic environment. This can be achieved, for example, by the use of polyureas whose starting materials have been modified by means of hydrocarbons.

Thus, US 2008/0097068 describes the use of caprolactones for preparing polyurea elastomers in order to achieve an increased chemicals resistance. However, the mechanical properties of the polyurea elastomers obtained are at a relatively low level.

Furthermore, US 2011/0098417, for example, describes the use of polybutadienediols as polymer constituent in the polyamine component and also in the isocyanate component. This leads to a higher resistance of the polyurea elastomers to various acids, bases and organic solvents. However, polybutadienediols are expensive and difficult to prepare. In addition, the use of the polybutadienediols increases the viscosity of the polyamine or polyisocyanate component, as a result of which the components for preparing the polyureas are difficult to process. Finally, the mechanical properties of the polyurea elastomers obtained are also in need of improvement.

WO 2010/039986 describes amine-functionalized polyisobutenes which are used as constituent of the polyamine component for preparing polyurea elastomers in order to achieve a greater chemicals resistance. Amine-functionalized polyisobutenes are also expensive and difficult to prepare. In addition, the use of the amine-functionalized polyisobutenes increases the viscosity of the polyamine component, as a result of which the components for preparing the polyureas are difficult to process. Finally, here too, the mechanical properties of the polyurea elastomers obtained are in need of improvement.

EP 1112838 discloses compact polyurethane elastomers obtained from polymer polyols. The influence of the polymer polyols on the chemicals resistance of these polyurethane elastomers was not examined, especially in the light of the fact that polyurea elastomers in principle have a higher chemicals resistance than polyurethane elastomers.

EP 84841 describes polyurea foams and polyurea elastomers produced from polyamines having terminal, aromatic amino groups, which comprise polymers based on free-radically polymerized monomers. According to EP 84841, aromatically bound amine groups are essential to obtain a usable polyurea elastomer. Comparative example 9 demonstrates the attempt to obtain a polyurea elastomer from an aliphatic polyether amine and a toluene-based isocyanate. This gives a sticky, wax-like and thus low value product.

EP 528432 describes polyurea resins for RIM processes, which comprise solid particles obtainable by free-radical in situ polymerization of at least two ethylenically unsaturated monomers, at least one of the ethylenically unsaturated monomers being a monofunctional acrylate monomer whose homopolymer has a glass transition temperature below $-20°$ C.; mention is made of acrylic esters. This leads to polyurea elastomers having an improved impact strength at low temperatures. A disadvantage is that acrylic esters are susceptible to hydrolysis and are therefore disadvantageous for a high chemical resistance.

It was therefore an object of the present invention to provide a process for preparing polyurea elastomers which can be carried out simply and inexpensively, with the polyurea elastomers obtained having a high chemicals resistance and good mechanical properties.

It has surprisingly been found that the use of dispersed filler particles in a liquid starting component for preparing the polyurea elastomers, for example in the component which is reactive toward isocyanates, in particular polymer polyols or polymer polyamines, can improve the chemicals resistance of polyurethane elastomers and polyurea elastomers.

In particular, the present object is achieved by a process for preparing polyurea elastomers, in which (a) polyisocyanates are mixed with (b) polyamines, (c) optionally amine chain extenders comprising primary or secondary amine groups, (d) optionally polyols and (e) optionally auxiliaries and additives to form a reaction mixture and cured, where at least one of the components (a) to (d) comprises dispersed filler particles. The object of the invention is likewise achieved by polyurea elastomers obtained by this process.

Polyurea elastomers are reaction products of an at least bifunctional isocyanate with an at least bifunctional primary or secondary amine. Polyurea elastomers are usually compact polyureas. Here, compact means that the density of the polyurea elastomers is usually in the range from 800 to 1500 g/l, preferably from 850 to 1300 g/l and in particular from 900 to 1200 g/l. Polyurea elastomers according to the invention display elastomeric properties, i.e. they have a tensile strength in accordance with DIN 53504 of at least 10 MPa, preferably at least 12 MPa and in particular at least 15 MPa, and an elongation at break in accordance with DIN 53504 of at least 100%, preferably from 150 to 1000% and in particular from 200 to 800%. Here, the test specimens are stored for at least 24 hours at 23° C. and 50% relative atmospheric humidity after they have been produced and before the measurement.

As polyisocyanates (a), it is possible to use any polyisocyanates which are known for the preparation of polyurea elastomers and comprise diphenylmethane 2,4'-diisocyanate and/or diphenylmethane 4,4'-diisocyanate, also referred to as 2,4'-MDI and 4,4'-MDI. These are usually used in the form of prepolymers. For this purpose, isocyanates (a1) are reacted in excess with polyols (a2) and/or chain extenders (a3) to form isocyanate-terminated prepolymers. Preference is given to using diphenylmethane 2,4'-diisocyanate and/or diphenylmethane 4,4'-diisocyanate as isocyanates (a1). The isocyanates (a1) particularly preferably comprise diphenylmethane 2,4'-diisocyanate and diphenylmethane 4,4'-diisocyanate. In addition, it is also possible to use further, customary isocyanates, preferably aromatic diisocyanates, in particular tolylene diisocyanate, monomeric diphenylmethane diisocyanates such as 2,2'-MDI or homologs of diphenylmethane diisocyanate having more than two rings, viz. polymeric MDI, and mixtures of these diisocyanates. Diphenylmethane diisocyanate can also be used as a mixture with its derivatives. Here, diphenylmethane diisocyanate can particularly preferably comprise up to 10% by weight, more particularly preferably up to 5% by weight, of carbodiimide-, uretdione-, allophanate- or uretonimine-modified diphenylmethane diisocyanate, in particular carbodiimide-modified diphenylmethane diisocyanate. Preference is given to using only bifunctional isocyanates in addition to 2,4'-MDI and 4,4'-MDI. The proportion of 2,4'-MDI and 4,4'-MDI in the isocyanates (a1) is preferably greater than 60% by weight, particularly preferably greater than 80% by weight and in particular greater than 98% by weight. Here, the weight ratio of 2,4'-MDI to 4,4'-MDI is preferably from 10:90 to 90:10, particularly preferably from 30:70 to 70:30 and in particular from 40:60 to 60:40.

As polyol (a2), it is usual to use polyols known in polyurethane chemistry. Polyols (a2) have a number average molecular weight of greater than 400 g/mol, preferably greater than 550 g/mol, and can be, for example, polyetherols, polyesterols or polycarbonatols, where the average functionality of the polyols is preferably from <3 to 1.7, particularly preferably from <2.5 to 1.9 and in particular from <2.1 to 1.9.

Polyetherols are prepared by known processes, for example from one or more alkylene oxides having from 2 to 4 carbon atoms in the alkylene radical by anionic polymerization using alkali metal hydroxides or alkali metal alkoxides as catalysts with addition of at least one starter molecule comprising from 2 to 3 hydrogen atoms which are reactive toward isocyanate groups or by cationic polymerization using Lewis acids such as antimony pentachloride or boride fluoride etherate. Suitable alkylene oxides are, for example, tetrahydrofuran, 1,3-propylene oxide, 1,2- or 2,3-butylene oxide and preferably ethylene oxide and 1,2-propylene oxide. Furthermore, multimetal cyanide compounds, known as DMC catalysts, can be used as catalysts. The alkylene oxides can be used in particular, alternately in succession or as mixtures. Preference is given to using mixtures of 1,2-propylene oxide and ethylene oxide, with the ethylene oxide being used in amounts of from 10 to 50% as ethylene oxide end block ("EO cap"), so that the polyols formed have more than 70% primary OH end groups.

Possible starter molecules are water or 2- and 3-hydric alcohols such as ethylene glycol, 1,2- and 1,3-propanediol, diethylene glycol, dipropylene glycol, 1,4-butanediol, glycerol or trimethylolpropane, preferably ethylene glycol, 1,2- and 1,3-propanediol, diethylene glycol, dipropylene glycol, tripropylene glycol and 1,4-butanediol.

The polyether polyols, preferably polyoxypropylene-polyoxyethylene polyols, have an average functionality of from 1.7 to 3, particularly preferably from 1.8 to 2.5 and in particular from 1.9 to 2.1, and molecular weights of preferably from 1000 to 12 000 g/mol, particularly preferably from 1400 to 8000 g/mol and in particular from 1700 to 6000 g/mol. Preference is given to using polyether polyols which have been prepared from a bifunctional starter by DMC catalysis. As polyether polyols, particular preference is given to using polytetrahydrofuran. Here, the functionality is usually from 1.8 to 3, preferably from 1.9 to 2.2 and particularly preferably from 1.95 to 2.1, and the number average molecular weight is usually from 500 to 5000 g/mol, preferably from 750 to 4000 g/mol, particularly preferably from 800 to 2500 g/mol and in particular from 1500 to 2200 g/mol.

Polyester polyols can, for example, be prepared from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in a mixture with one another. In place of the free dicarboxylic acids, it is also possible to use the corresponding dicarboxylic acid derivatives, e.g. dicarboxylic esters of alcohols having from 1 to 4 carbon atoms or dicarboxylic anhydrides. Preference is given to using dicarboxylic acid mixtures of succinic, glutaric and adipic acids in weight ratios of, for example, 20-35:35-50:20-32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactones, e.g. caprolactone, or hydroxycarboxylic acids, e.g. hydroxycaproic acid.

To prepare the polyester polyols, the organic, e.g. aromatic and preferably aliphatic, polycarboxylic acids and/or derivatives thereof and polyhydric alcohols can be polycondensed in the absence of catalysts or preferably in the presence of esterification catalysts, advantageously in an atmosphere of inert gas, e.g. nitrogen, carbon monoxide, helium, argon, etc., in the melt at temperatures of from 150 to 250° C., preferably from 180 to 220° C., optionally under reduced pressure, to the desired acid number which is preferably less than 10, particularly preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene in order to azeotropically distill off the water of condensation. To prepare the polyester polyols, the organic polycarboxylic acids and/or derivatives thereof and polyhydric alcohols are advantageously polycondensed in a molar ratio of 1:1-1.8, preferably 1:1.05-1.2.

The polyester polyols obtained preferably have a functionality of from 1.8 to 3, particularly preferably from 1.9 to 2.5 and in particular from 1.95 to 2.1, and a molecular weight of from 480 to 5000 g/mol, preferably from 1000 to 4500 g/mol and in particular from 1600 to 4500 g/mol.

As polyols (a2), it is possible to use, for example, filler-comprising polyols. These filler-comprising polyol dispersions are also referred to as polymer polyols or graft polyols. Such filler-comprising polyol dispersions are known and their preparation is described, for example, in "Mihail Ionescu, Chemistry and Technology of Polyols for Polyurethanes, Rapra Technology Ltd., 2005, ISBN: 185957-491-2).

Chain extenders (a-3) can optionally be added to the reaction to form the polyisocyanate prepolymer. Suitable chain extenders (a-3) for the prepolymer are dihydric or trihydric alcohols, for example dipropylene glycol and/or tripropylene glycol, or the adducts of dipropylene glycol and/or tripropylene glycol with alkylene oxides, preferably dipropylene glycol, but preference is given to no chain extenders (a3) being added.

As an alternative, all or some of the components (a2) and (a3) described can be replaced by the compounds described under polyamines (b) or amine chain extenders (c).

To prepare the isocyanate prepolymer, isocyanate (a1), polyol (a2) and optionally further polyols, chain extenders and/or crosslinkers are mixed. This is done in such a ratio that the NCO content of the prepolymer is at least 5% by weight, preferably at least 7% by weight and not more than 33% by weight, particularly preferably from 10 to 30% by weight, more preferably from 12 to 25% by weight and in particular from 14 to 20% by weight. The mixture is preferably heated to temperatures of from 30 to 100° C., particularly preferably from 50 to 90° C. and in particular about 80° C.

In a further, preferred embodiment, the polyisocyanates (a1) are also used directly, without conversion into the prepolymer, as polyisocyanates (a).

As polyamines (b), use is made of at least one polyoxyalkyleneamine, preferably a mixture of at least two polyoxyalkyleneamines, known as polyether amines. Such polyoxyalkyleneamines are preferably amine-terminated bifunctional or higher-functional polyalkylene oxides, in general polyoxyethylene oxides or polyoxypropylene oxides, having number average molecular weights of at least 350 g/mol, for example in the range from 350 to 6000 g mol$^{-1}$, preferably from 380 to 5100 g mol$^{-1}$, wherein the amino group is preferably aliphatically bonded. It is also possible to use amine-terminated polytetrahydrofuran (PTHF). The amine groups of the polyether amines are preferably primary amine groups. It is also possible to use only one polyether amine. The polyether amines (b) are in particular diamines or triamines. Such compounds are marketed, for example, by Huntsman under the name Jeffamine® or by BASF as polyether amines under the name Baxxodur®.

Polyamines are usually prepared by catalytic amination of the corresponding polyalcohols. The preparation of the polyether alcohols and polyester alcohols which are preferably aminated has been disclosed above in the description of the component (a2). In particular, 2- or 3-functional polypropylene oxides are converted into the corresponding diamines or triamines.

Possible filler particles are all reinforcing fillers having an average particle diameter along the longest axis of from 0.001 to <100 µm, preferably from 0.01 to 50 µm, particularly preferably from 0.1 to 10 µm and in particular from 0.2 to 3 µm. Here, the particle size distribution can be monomodal or bimodal or multimodal. The filler particles are preferably essentially spherical and the longest axis of the particle is preferably not greater than twice the shortest axis. Filler particles comprise inorganic and organic fillers which can preferably be dispersed in the polyamines (b). The inorganic particles can be semimetals oxides, metal oxides, for example oxides of the following metals: Zn, Al, Si, Fe, Ti, B, Zr and V, mixed oxides, carbides, nitrides, carbonates, e.g. $CaCO_3$, hydroxides, carbon such as graphite, graphene, nanotubes, carbon black and/or fibers, inorganic salts, inorganic pigments, silicone resins, silicones and/or silica or mixtures thereof, where these classes of particles mentioned can all optionally be surface-modified, for example hydrophobized or hydrophilized. For hydrophobization, it is possible to use, for example, at least one compound from the group consisting of silanes, siloxanes, quaternary ammonium compounds, cationic polymers and fatty acids and anions thereof.

As inorganic particles, it is also possible to use various silicate materials. For this purpose, it is possible to use silicate materials of various origins, e.g. silica sol, with silica being able to be dispersed in water, (mono)alcohol or in a polyol, surface-functionalized silica sols, sheet silicates, or pyrogenic silica. Examples of commercially available silicate materials which can be used according to the invention are Laponit®, Optigel®, Levasil® and Aerosil®.

As inorganic fillers, it is possible to use, for example, polymer particles. Here, preference is given to using thermoplastic polymers. These fillers are present in dispersed form in the reaction mixture. The fillers are in this case preferably present as a dispersion in one or more of the components (a) to (d), particularly preferably in one or more of the components (b) to (d). In particular, the filler particles are present as a dispersion in the polyamines (b).

For example, the filler particles can be introduced into one or more of the components (a) to (d) by dispersing, optionally with the aid of a stabilizer, or by polymerization of monomers. If thermoplastic polymer particles are used as filler particles, these can also be dispersed in the form of their melt in one of the components (a) to (d), for example in the isocyanate component.

If the fillers are to be dispersed in the isocyanates, it is possible to use, for example, filler-comprising polyols as polyols (a2). These filler-comprising polyol dispersions are also referred to as polymer polyols or graft polyols. Such filler-comprising polyol dispersions are known and their preparation is described, for example, in "Mihail Ionescu, Chemistry and Technology of Polyols for Polyurethanes, Rapra Technology Ltd., 2005, ISBN: 185957-491-2).

Dispersions of polymer particles in polyamines (b), also referred to as polymer polyamines or graft polyamines, can be prepared by free-radical polymerization of the monomers, optionally one or more stabilizers and optionally one or more macromers and optionally one or more moderators using a free-radical initiator, usually azo or peroxide compounds either alone or in mixtures with further initiators in a polyether amine or polyester amine as continuous phase. The polyether amine or polyester amine which represents the continuous phase is frequently also referred to as carrier polyamine. As an example of the preparation of polymer polyamines, reference may be made by way of example to the U.S. Pat. No. 4,286,074. For the purposes of the invention, the use of polymer polyamines is particularly preferred. Possible carrier polyamines are all polyamines described under b).

Suitable ethylenically unsaturated monomers for preparing the filler material of the polymer polyamine are, apart from styrene and acrylonitrile, for example, butadiene, isoprene, 1,4-pentadiene, 1,6-hexadiene, 1,7-octadiene, styrene, alpha-methylstyrene, 2-methylstyrene, 3-methylstyrene, 4-methylstyrene, 2,4-dimethylstyrene, ethylstyrene, isopropylstyrene, butylstyrene, phenylstyrene, cyclohexylstyrene, benzylstyrene and similar derivatives; substituted styrenes such as cyanostyrene, nitrostyrene, N,N-dimethylaminostyrene, acetoxystyrene, methyl-4-vinyl benzoate, phenoxystyrene, p-vinylphenyl oxide and similar derivatives and mixtures thereof; acrylonitrile, acrylic acid, methacrylic acid, methacrylonitrile, vinyl methyl ketone, vinyl ethyl ketone, vinyl phenyl ketone, vinyl ethyl sulfone, N-methyl-N-vinylacetamide, N-vinylpyrrolidone, vinylimidazole, divinyl sulfoxide, divinyl sulfone, sodium vinylsulfonate, methyl vinylsulfonate, N-vinylpyrrole, vinyl phosphonate and similar derivatives; dimethyl fumarate, dimethyl maleate, maleic acid, crotonic acid, fumaric acid, itaconic acid, monomethyl itaconate, allyl alcohol, vinylpyridine and similar derivatives and mixtures thereof. Preferred ethylenically unsaturated monomers are styrene, acrylonitrile, and mixtures thereof.

In a preferred embodiment, acrylonitrile, styrene, in particular styrene and acrylonitrile in a ratio in the range from 1:3 to 3:1, are used as ethylenically unsaturated monomers. Furthermore, a macromer is preferably added to the polymerization. The polymerization is also optionally carried out using a moderator and using a free-radical initiator.

Macromers are linear or branched polyether amines and/or polyols which have molecular weights of ≥1000 g/mol and comprise at least one terminal, reactive ethylenically unsaturated group. The ethylenically unsaturated group can be attached to an existing polyamine by reaction of polyether amines and/or polyols with carboxylic acids such as acrylic acid, carboxylic halides such as acryloyl chloride, carboxylic acid anhydrides such as maleic anhydride, fumaric acid, acrylate and methacrylate derivatives, ethylenically unsaturated epoxides such as 1-vinylcyclohexene 3,4-epoxide, 1-butadiene monoxide, vinyl glycidyl ether, glycidyl methacrylate and allyl glycidyl ether and also isocyanate derivatives such as 3-isopropenyl-1,1-dimethylbenzyl isocyanate (TMI®), isocyanatoethyl methacrylate. A further route is preparation of a polyamine by alkoxylation of propylene oxide and ethylene oxide using starter molecules having hydroxyl groups and ethylenic unsaturation, with the terminal OH group being converted by catalytic amination into the amine. It is also possible for all macromers of part of the macromers to have OH functions instead of amine functions. These can be obtained by dispensing with the amination step or attaching an ethylenically unsaturated group to an existing polyol. Here, the preparation of the macromer is usually carried out using the unsaturated compound in a molar excess, based on the polyamine or polyol.

Stabilizers which can optionally be used for the preparation of dispersions of polymer particles in polyamines (b) are, for example, described in the patent WO 2009/138379.

Agglomeration of the particles can be prevented by use of macromers. During the free-radical polymerization, the macromers are, if present, incorporated concomitantly into the polymer chain. In this way, copolymers having polyether blocks and for example polyacrylonitrile-styrene blocks are formed and act as phase compatibilizers in the interface between continuous phase and dispersed phase and suppress agglomeration of the polymer particles. The proportion of macromers can be up to >90% by weight and is usually from 1 to 60% by weight, preferably from 1 to 40% by weight and particularly preferably from 1 to 15% by weight, in each case based on the total weight of the monomers used for preparing the polyether polyamine. The grafting reaction of carrier polyol or carrier polyether amine with the free-radically polymerizing monomer also leads to stabilization of the filler particles.

Moderators, also referred to as chain transfer agents, are usually used for preparing polymer polyamines. The moderators bring about chain transfer of the growing radicals and thus reduce the molecular weight of the copolymers being formed, as a result of which the crosslinking between the polymer molecules is reduced, which in turn influences the viscosity and the stability of the dispersion and also the filterability of the polymer polyamines. The proportion of moderators is usually from 0.5 to 25% by weight, based on the total weight of the monomers used for preparing the polymer polyamine. Moderators which are usually used for preparing polymer polyamines are alcohols such as 1-butanol, 2-butanol, isopropanol, ethanol, methanol, cyclohexane, toluene, mercaptans, such as ethanethiol, 1-heptanethiol, 2-octanethiol, 1-dodecanethiol, thiophenol, 2-ethylhexyl thioglycolates, methyl thioglycolates, cyclohexyl mercaptan and also enol ether compounds, morpholines and α-(benzoyloxy) styrene. Preference is given to using alkyl mercaptan.

The free-radical polymerization is usually initiated using peroxide and/or azo compounds, e.g. dibenzoyl peroxide, lauroyl peroxide, t-amyl peroxy-2-ethylhexanoate, di-t-butyl peroxide, diisopropyl peroxocarbonate, t-butyl peroxy-2-ethylhexanoate, t-butyl perpivalate, t-butyl perneodecanoate, t-butyl perbenzoate, t-butyl percrotonate, t-butyl perisobutyrate, t-butyl peroxy-1-methylpropanoate, t-butyl peroxy-2-ethylpentanoate, t-butyl peroxyoctanoate and di-t-butyl perphthalate, 2,2'-azobis(2,4-dimethylvaleronitrile), 2,2'-azobisisobutyronitrile (AIBN), dimethyl 2,2'-azobisisobutyrate, 2,2'-azobis(2-methylbutyronitrile) (AMBN), 1,1'-azobis(1-cyclohexanecarbonitrile). The proportion of the initiators is usually from 0.1 to 6% by weight, based on the total weight of the monomers used for preparing the polymer polyamine.

The free-radical polymerization for preparing polymer polyamines is, owing to the reaction rate of the monomers and the half life of the initiators, usually carried out at temperatures of from 70 to 150° C. and a pressure of up to 20 bar. Preferred reaction conditions for preparing polymer polyamines are temperatures of from 80 to 140° C. and a pressure from atmospheric pressure to 15 bar.

Polymer polyamines can be prepared in continuous processes using stirred vessels with continuous introduction and discharge, cascades of stirred vessels, tube reactors and loop reactors having continuous introduction and discharge, or in discontinuous processes by means of a batch reactor or a semibatch reactor.

The reaction for preparing the polymer polyamines can also be carried out in the presence of an inert solvent. Solvents which can be used are, for example: benzene, toluene, xylene, acetonitrile, hexane, heptane, dioxane, ethyl acetate, N,N-dimethylformamide, N,N-dimethylacetamide, etc. Preference is given to benzene, xylene and toluene.

As an alternative, the dispersed filler particles can also be obtained by the melt emulsification process. This process is described in WO2009/138379. Here, a thermoplastic polymer, optionally together with stabilizer, and polyamine (b) are heated to a temperature above the melting point of the thermoplastic polymer, homogenized, for example by means of ultrasound, an extruder or a gear dispersing machine, and cooled to a temperature below the melting point of the thermoplastic polymer. It is in principle possible to use all thermoplastic polymers. Preference is given to using thermoplastic polymers which can be obtained by polymerization of the abovementioned monomers. An emulsifier is optionally also added. For example, the stabilizers and emulsifiers which are described in WO 2009/138379 can be used.

In a preferred embodiment, the thermoplastic polymer for use in the melt emulsification process is selected from the group consisting of polystyrene, poly(styrene-co-acrylonitrile), polyacrylonitrile, polyacrylate, polymethacrylate, polyolefins such as polypropylene, polyethylene, polyisobutylene, polybutadiene, polyester, polyamide, polyvinyl chloride, polyethylene terephthalate, polyvinyl acetate, polyethylene glycol, polyurethane, polyurea and mixtures thereof, preferably from the group consisting of poly(styrene-co-acrylonitrile), polyacrylonitrile and mixtures thereof.

The polymer polyamine is preferably prepared using a bifunctional polyether amine having predominantly primary amine groups and a number average molecular weight of at least 350 g/mol, for example in the range from 350 to 6000 g/mol, preferably from 380 to 5100 g/mol, as carrier polyamine.

In a further, preferred embodiment of the invention, the polymer polyamine aminated polytetrahydrofuran (PTHF), usually having a number average molecular weight of from 300 to 4000 g/mol, preferably from 750 to 3000 g/mol, preferably from 800 to 2500 g/mol, in particular about 2000 g/mol, is used as carrier polyamine.

In a preferred embodiment, the filler component comprises acrylonitrile, styrene and optionally macromer, with the proportion of acrylonitrile being from 10 to 75% by weight and preferably from 25 to 40% by weight, the proportion of styrene being from 30 to 90% by weight, preferably from 55 to 75% by weight and the proportion of macromer being from 0 to 30% by weight, preferably from 3 to 10% by weight, based on the total weight of the filler component of the polymer polyamine.

In a preferred embodiment, the polymer polyamine has a filler content of from 10 to 80% by weight, particularly preferably from 25 to 60% by weight and in particular from 35 to 55% by weight, based on the total weight of the polymer polyamine.

The filler content of polymer polyamines is calculated as the percentage ratio of the monomers used and the macromer to the carrier polyamines used and is usually determined on the finished polymer polyamine gravimetrically from the percentage ratio of the amount of filler to the total mass of the polymer polyamine.

The filler content, based on the total weight of the components (a) to (e), is at least 0.5% by weight. The filler content is preferably from 1 to 30% by weight, particularly preferably from 5 to 27% by weight, more preferably from 7 to 25% by weight and in particular from 10 to 22% by weight, in each case based on the total weight of the components a) to e). It is also possible to use mixtures of different filler particles.

As amine chain extenders (c), use is made of aromatic and aliphatic diamines having a molecular weight of less than 350 g/mol and preferably from 60 to 250 g/mol. The chain extender most often used in polyurea elastomers is diethylenetoluenediamine (DETDA). As component which is relatively unreactive compared to aliphatic amines, DETDA determines the curing behavior of the system. Accordingly, the gel time can be controlled by means of alternative chain extenders having a reduced activity toward isocyanates. To obtain light-stable polyurea spraying elastomers, it is also possible to use aliphatic chain extenders. In addition, the alternative amine chain extenders mentioned above, e.g. 4,4'-methylenebis(2,6-diethyl)aniline (MDEA), 4,4'-methylenebis(2,6-diisopropyl)aniline (MDIPA), 4,4'-methylenebis(3-chloro-2,6-diethyl)aniline (MCDEA), dimethylthiotoluenediamine (DMTDA, Ethacure® 300), or reaction-retarding chain extenders having secondary amine functions, e.g. N,N'-di(sec-butyl)aminobiphenylmethane (DBMDA, Unilink® 4200) or N,N'-di-sec-butyl-p-phenylenediamine (Unilink® 4100), can be used.

Furthermore, the reaction mixture for preparing the polyurea elastomers of the invention can also comprise polyols (d). These comprise all polyols described under (a2). The proportion of the polyols (d) in the total weight of the polyamines (b) and the polyols (d) is preferably less than 50% by weight, particularly preferably less than 20% by weight, more preferably less than 10% by weight. In particular, no polyols (d) are used. The polyols (a2) are not taken into account in the calculation of the proportion of the polyols (d).

The auxiliaries and additives comprise catalysts, surface-active substances, flame retardants, reinforcing materials, bonding agents, UV stabilizers, antioxidants, dyes, pigments and hydrolysis inhibitors and also fungistatic and bacteriostatic substances. The addition of additives to the amine component is limited by the need for a processable viscosity. Preferred additives are pigments, bonding agents, UV stabilizers, antioxidants, and/or reinforcing materials. These substances are known in polyurethane and polyurea production.

For the purposes of the present invention, reinforcing materials are the conventional organic and inorganic reinforcing materials or weighting agents known per se having a particle diameter of greater than 100 µm. Here, the particle diameter is the longest axis. In the case of chopped glass fibers, for example, the "particle diameter" would be the length of the fibers. Specific examples which may be mentioned are: inorganic fillers such as siliceous minerals, for example sheet silicates such as antigorite, bentonite, serpentine, hornblendes, amphiboles, chrysotile and talc, metal oxides such as kaolin, aluminum oxides, titanium oxides, zinc oxide and iron oxides, metal salts such as chalk and barite and inorganic pigments such as cadmium sulfide, zinc sulfide and also glass, etc. Preference is given to using kaolin (China Clay), aluminum silicate and copracipitates of barium sulfate and aluminum silicate and glass fibers. Examples of possible organic fillers are: carbon black, melamine, rosin, cyclopentadienyl resins and graft polymers and also cellulose fibers, polyamide, polyacrylonitrile, polyurethane, polyester fibers based on aromatic and/or aliphatic dicarboxylic acids and in particular carbon fibers.

The inorganic and organic reinforcing materials can be used individually or as mixtures and are advantageously added to the reaction mixture in amounts of from 0.5 to 50% by weight, preferably from 1 to 40% by weight, based on the weight of the components (a) to (e).

To prepare the polyurea elastomers of the invention, the components (a) to (e) are preferably mixed at temperatures of from 10 to 90° C., particularly preferably from 15 to 70° C. and in particular from 20 to 50° C. This mixture is then applied, preferably as coating, to an article and cured to form the polyurea elastomer. For this purpose, the components (b) and, if present, (c) to (e) can also be mixed to form a polyol component which is then mixed with the isocyanate component (a). Here, the mixing ratios are selected so that the equivalence ratio of NCO groups of the polyisocyanates (a) to the sum of the reactive hydrocarbon atoms of the components (b) and optionally (c) and (d) is 0.9-1.2:1, preferably 1.0-1.15:1. A ratio of 1:1 corresponds to an isocyanate index of 100.

The thickness of the polyurea elastomer coating is preferably from 0.01 mm to 20 cm, preferably from 0.1 mm to 5 cm and particularly preferably from 0.5 mm to 10 mm.

Further formulation constituents which are not absolutely necessary are, for example, diluents, usually reactive diluents, which when employed are generally added to the isocyanate component. Examples of reactive diluents for the isocyanate components are alkylene carbonates. However, the addition of reactive diluents can lead to a deterioration in the mechanical properties and the aging resistance of the polyurea spraying elastomer.

The component b) can also comprise, in particular, abrasion improvers. As abrasion improvers, preference is given to using silicone-modified alcohols, in particular glycols.

The system is generally applied by spraying, with the components being mixed and thus reacted under high pressure and at elevated temperature in the mixing head of the spray gun before discharge from the latter. As an alternative, the components can also be applied individually to the surface to be coated, with mixing occurring by spontaneous mixing of the droplets. The reaction time is usually only a few seconds. For the purposes of the invention, the mixture of the components (a) to (e) at reaction conversions of less than 90%, based on the isocyanate groups, will be referred to as reaction mixtures.

The volume ratio in which the polyisocyanate and amine component are sprayed is preferably 1:1, but can also be from 30:70 to 70:30% by volume, but preferably up to 1.1:1. The sprayed surface can, particularly when it is moist, be pretreated by means of a primer to improve adhesion. The adhesion promoter can, likewise particularly for adhesion to a moist substrate, also be added to the isocyanate or preferably polyamine component.

Examples of primers are siloxanes and functionalized siloxanes. Particular mention may be made of epoxyalkoxysilanes, aminoalkoxysilanes and vinylalkoxysilanes. Further examples of commercially available primers are titanates such as neopentyl(dially)oxytri(m-amino)phenyl titanate or zirconates such as neopentyl(diallyl)oxytri(m-ethylenediamino)ethylzirconate. Further possible primers are 1-component or 2-component polyurethane systems, polyvinylamines, polyacrylates and epoxy resins. The primers can be dispersed, emulsified or dissolved in water or other solvents before application.

Any surface can be sprayed. The surface to be sprayed is preferably a mineral surface, for example concrete, or a metallic surface, for example steel.

The invention further provides a polyurea elastomer which can be obtained by a process according to the invention.

A polyurea elastomer according to the invention is preferably used for coating surfaces which are to be protected against mechanical and chemical stress, for example industrial floors, concrete repair and water protection, for example for roof and parking deck coatings and also bridge and tunnel repairs, "secondary containments" such as collection basins for chemical tanks, wastewater tanks or oil tanks, for dangerous goods loading zones, as corrosion protection, for example for loading areas of freight ships, goods vehicles, pickups and railroad cars, or "primary containment" such as wastewater shafts, water treatment plants or reactors, for example bioreactors. In particular, the polyurea elastomers of the invention are used for coating reactors such as bioreactors, collection basins for chemicals, in particular acidic chemicals, or in contact with wastewater, for example in water treatment plants or wastewater pipes.

The polyurea elastomers obtained are particularly resistant to chemicals. This is reflected, in particular in very good mechanical properties after storage in acids.

A further advantage of the present invention is the easy processability of the components, in particular because of the low viscosity of the polyamines (b) comprising dispersed filler particles compared to the starting compounds for preparing known, chemicals-resistant polyureas. The novel polyurea elastomers obtained also have very good mechanical properties, for example a high hardness of at least 80 Shore A, preferably at least 85 Shore A and in particular at least 40 Shore D.

The invention is illustrated below with the aid of examples.

EXAMPLES

The viscosities were measured in accordance with ASTM D7042; the OH numbers were determined in accordance with DIN 53240; the amine numbers were determined in accordance with DIN 13717.

The particle size distributions were measured by means of a Malvern Mastersizer. The individual values have the following meanings:

D10: 10% of the total volume of the particles have a diameter which is smaller than the value indicated D50: 50% of the total volume of the particles have a diameter which is smaller than the value indicated D90: 90% of the total volume of the particles have a diameter which is smaller than the value indicated Mastersizer (measurement of the particle size distribution): Mastersizer 2000 (principle of static light scattering); samples were diluted with isopropanol to the concentration required for the measurement.

Starting Materials:

Polyether amine 1: aliphatic primary amine-terminated polyoxypropylene diamine having an amine number of 56.7 mg KOH/g.

Polyether amine 2: aliphatic primary amine-terminated polyoxypropylene diamine having an amine number of 249.5 mg KOH/g.

Chain extender: 80:20% by weight mixture of 3,5-diethyl-2,4-toluenediamine and 3,5-diethyl-2,6-toluenediamine.

Isocyanate: 50:50 isomer mixture of 4,4'- and 2,4'-MDI.

Macromer: Hexafunctional polyetherol having a hydroxyl number of 18.4 mg KOH/g, reacted with TMI® (Meta).

TMI® (Meta)=unsaturated aliphatic isocyanate from Cytec Industries

DBTL: Dibutyltin dilaurate, TRIGON Chemie GmbH

Vazo® 64=Radical initiator from DuPont

Example 1

Preparation of the Polymeric Polyether Amine 663.4 g of polyether amine 1 and 5.4 g of macromer were placed in a stirring autoclave and heated to 125° C. 363.2 g of acrylonitrile, 726.5 g of styrene, 11.4 g of dodecanethiol, 6.5 g of Vazo® 64 and 60 g of macromer dissolved in 663.4 g of polyether amine 1 were subsequently added to the reaction mixture over a period of 150 minutes. After an after-reaction time of 15 minutes, the product was freed of residual monomer by application of a vacuum of 7 mbar. This gave a polymer polyether amine having a viscosity of 2832 mPas at 25° C. and an amine number of 29.8 mg KOH/g. The result of the particle size distribution: D10=0.328 μm, D50=0.662 μm and D90=0.999 μm.

Preparation of Polyurea Elastomers

As isocyanate component for the preparation of the polyurea elastomers, an isocyanate prepolymer was prepared from isocyanate (51.6% by weight, based on the total weight of the isocyanate prepolymer) and a bifunctional polypropylene glycol (48.4% by weight, based on the total weight of the isocyanate prepolymer) having an OH number of 56 mg KOH/g. The isocyanate prepolymers obtained have an NCO content of 15.0±0.1% and a viscosity at 25° C. of 800±100 mPas.

The starting substances as per table 1 were sprayed by means of a commercially available Isotherm PSM 3000 spraying machine at a temperature of from 60 to 80° C. and a pressure of from 150 to 180 bar onto Teflon plates (60 cm*60 cm) to form a polyurea elastomer having a layer thickness of about 20 mm.

The reactivities of the styrene-acrylonitrile-filled polyurea systems (gel times and tack-free times) are comparable to the reference system. The characteristic mechanical properties of the polyurea elastomers obtained are likewise shown in table 1.

TABLE 1

|  | Reference | Polyurea 1 | Polyurea 2 |
|---|---|---|---|
| Formulations |  |  |  |
| Iso prepolymer | 110 | 93 | 84 |
| Polyether amine 1 | 63.1 | 34.6 | — |
| Polymer polyether amine | — | 34.6 | 72.8 |
| Polyether amine 2 | 17 | 14.2 | 11.2 |
| Chain extender | 19.9 | 16.5 | 16.0 |
| Index | 105 | 105 | 105 |
| Calculated SAN content | 0% | 9% | 19% |
| Viscosity of polyol comp. at 25° C. [mPa · s] | 230 | 850 | 1200 |
| Mechanical properties |  |  |  |
| Shore hardness A/D (DIN 53505) | 90/41 | 91/43 | 95/48 |
| Density [g/cm$^3$] (DIN 53479) | 0.964 | 0.975 | 1.019 |
| Tensile strength [MPa] (DIN 53504) | 21 | 19 | 21 |
| Elongation at break [%] (DIN 53504) | 480 | 470 | 350 |
| Tear propagation resistance [N/mm] (DIN 53515) | 56 | 49 | 54 |
| Abrasion [mm$^3$] (DIN 53516) | 224 | 184 | 162 |

The polyurea elastomers 1 and 2 prepared according to the invention display significantly improved abrasion values with increasing filler content compared to the reference without filler.

The acid and oxidation resistances of the sprayed plates are shown in tables 2, 3, 4 and 5. For this purpose, the specimens produced were stored for the time indicated at 23° C. in the acid indicated in each case. SAN-filled polyureas display a significant improvement in the resistances to nitric acid and sulfuric acid. The highly oxidative action of nitric acid is reduced with an increasing proportion of styrene-acrylonitrile particles. In the 10% strength nitric acid solution, virtually no external change is observed for examples 1 and 2 even after a number of weeks, while the example as per reference 1 discolors black after a few days. In concentrated nitric acid (68%), too, the examples according to the invention, viz. polyurea elastomer 1 and polyurea elastomer 2, display significantly reduced degradation compared to the reference.

TABLE 2

| HNO$_3$ 10% | 0 Days | | 14 Days | | 28 Days | | 42 Days | |
|---|---|---|---|---|---|---|---|---|
|  | Tensile str. MPa | Elong. % | Tensile str. Mpa | Elong. % | Tensile str. Mpa | Elong. % | Tensile str. Mpa | Elong. % |
| Reference | 22 | 480 | 6 | 350 | destroyed | | — | |
| Polyurea 1 | 20 | 470 | 8 | 350 | 8 | 350 | Not measurable | |
| Polyurea 2 | 21 | 350 | 12 | 300 | 13 | 300 | 12 | 310 |

TABLE 3

| HNO$_3$ conc. 68% | 2 Hours | 6 Hours |
|---|---|---|
| Reference | brown, partly dissolved | test specimen dissolved |
| Polyurea 1 | strongly yellowish | Brown, partly dissolved |
| Polyurea 2 | clear | slightly yellowish |

TABLE 4

| H$_2$SO$_4$ 20% | 0 Days | | 14 Days | | 28 Days | |
|---|---|---|---|---|---|---|
|  | Tensile str. Mpa | Elong. % | Tensile str. Mpa | Elong. % | Tensile str. Mpa | Elong. % |
| Reference | 22 | 480 | 13 | 460 | 13 | 470 |
| Polyurea 1 | 20 | 470 | 15 | 440 | 14 | 440 |
| Polyurea 2 | 21 | 350 | 18 | 340 | 18 | 320 |

TABLE 5

| HCl 10% | 0 Days | | 14 Days | | 28 Days | |
|---|---|---|---|---|---|---|
|  | Tensile str. Mpa | Elong. % | Tensile str. Mpa | Elong. % | Tensile str. Mpa | Elong. % |
| Reference | 22 | 480 | 13 | 390 | 11 | 360 |
| Polyurea 1 | 20 | 470 | 15 | 470 | 15 | 410 |
| Polyurea 2 | 21 | 350 | 17 | 360 | 17 | 310 |

The invention claimed is:

1. A process for preparing a polyurea elastomer, the process comprising:
   mixing
   (a) a polyisocyanate, comprising diphenylmethane 4,4'-diisocyanate, diphenylmethane 2,4'-diisocyanate, or both or
   a prepolymer thereof,
   with
   (b) a polyamine,
   (c) optionally an amine chain extender, comprising a primary or secondary amine group,
   (d) optionally a polyol and
   (e) optionally an auxiliary and an additive,
   thereby forming a reaction mixture and
   curing the reaction mixture,
   wherein at least one of components from (a) to (d) comprises dispersed filler particles, obtained by a process comprising polymerizing one or more monomers selected from the group consisting of styrene, acrylonitrile, butadiene, isoprene, 1,4-pentadiene, 1,6-hexadiene, 1,7-octadiene, alpha-methylstyrene, 2-methylstyrene, 3-methylstyrene, 4-methylstyrene, 2,4-dimethylstyrene, ethylstyrene, isopropylstyrene, butylstyrene, phenylstyrene, cyclohexylstyrene, benzylstyrene, cyanostyrene, nitrostyrene, N,N-di-methylaminostyrene, acetoxystyrene, methyl-4-vinyl benzoate, phenoxystyrene, p-vinylphenyl oxide, acrylonitrile, acrylic acid, methacrylic acid, methacrylonitrile, vinyl methyl ketone, vinyl ethyl ketone, vinyl phenyl ketone, vinyl ethyl sulfone, N-methyl-N-vinylacetamide, N-vinylpyrrolidone, vinylimidazole, divinyl sulfoxide, divinyl sulfone, sodium vinylsulfonate, methyl vinylsulfonate, N-vinylpyrrole, vinyl phosphonate, dimethyl fumarate, dimethyl maleate, maleic acid, crotonic acid, fumaric acid, itaconic acid, monomethyl itaconate, allyl alcohol, and vinylpyridine, and wherein said dispersed filler particles are present in at least one of components (a) and (b), or when said component (c), (d), and (c) and (d) is or are present, said dispersed filler particles are present in at least one of components (a), (b), (c), and (d).

2. The process according to claim 1,
wherein the polyisocyanate (a) is a polyisocyanate prepolymer.

3. The process according to claim 1,
wherein the polyurea elastomer comprises filler particles in an amount of from 1 to 30% by weight, based on a total weight of the polyurea elastomer.

4. The process according to claim 1,
wherein a proportion of the polyamine, based on a total weight of the polyamine (b) and the polyol (d), is at least 75% by weight.

5. The process according to claim 1,
wherein the filler particles are polymers.

6. The process according to claim 1,
wherein the filler particles are thermoplastic polymers.

7. The process according to claim 6,
wherein the thermoplastic polymers are dispersed in a form of their melt in one or more of components from (a) to (d).

8. The process according to claim 6,
wherein the filler particles are polystyrene-acrylonitrile particles.

9. The process according to claim 1,
wherein the filler particles have groups which are reactive toward isocyanate.

10. The process according to claim 1,
wherein the polyamine (b) comprises a polymer polyamine.

11. The process according to claim 1,
wherein the polyamine (b) comprises a polymer polyether amine.

12. The process according to claim 11, further comprising:
applying with elastomeric polyurea coating by spraying to a surface to be coated.

13. The process according to claim 1,
wherein the polyurea elastomer is an elastomeric polyurea coating.

14. The process according to claim 1, wherein said dispersed filler particles are present in said reaction mixture in an amount of more than 0.5% by weight based on the total weight of compounds (a) to (e).

15. The process according to claim 1, wherein said dispersed filler particles are present in said reaction mixture in an amount of from 0.5% to 30% by weight based on the total weight of compounds (a) to (e).

16. The process according to claim 1, wherein said dispersed filler particles are present in said reaction mixture in an amount of from 1% to 30% by weight based on the total weight of compounds (a) to (e).

17. The process according to claim 1, wherein said dispersed filler particles are present in said reaction mixture in an amount of from 5% to 27% by weight based on the total weight of compounds (a) to (e).

18. The process according to claim 1, wherein said dispersed filler particles are present in said reaction mixture in an amount of from 7% to 25% by weight based on the total weight of compounds (a) to (e).

* * * * *